US008826002B2

(12) United States Patent
Lan et al.

(10) Patent No.: US 8,826,002 B2
(45) Date of Patent: Sep. 2, 2014

(54) SYSTEM AND METHODS FOR FACILITATING SECURE COMMUNICATIONS ON A WEBSITE

(75) Inventors: Gang (Tiger) Lan, San Jose, CA (US); Michael Fertik, Palo Alto, CA (US); Saad Mir, Burlingame, CA (US); Abbey Sparrow, Redwood City, CA (US); Jeffrey A. Harnois, II, San Jose, CA (US)

(73) Assignee: Reputation.com, Inc., Redwood City, CA (US)

( * ) Notice: Subject to any disclaimer, the term of this patent is extended or adjusted under 35 U.S.C. 154(b) by 0 days.

(21) Appl. No.: 13/591,110

(22) Filed: Aug. 21, 2012

(65) Prior Publication Data
US 2012/0324217 A1    Dec. 20, 2012

Related U.S. Application Data

(63) Continuation of application No. 13/300,457, filed on Nov. 18, 2011.

(60) Provisional application No. 61/415,756, filed on Nov. 19, 2010.

(51) Int. Cl.
*H04L 29/06*   (2006.01)

(52) U.S. Cl.
USPC ........................................................ 713/153

(58) Field of Classification Search
USPC ........................................................ 713/153
See application file for complete search history.

(56) References Cited

U.S. PATENT DOCUMENTS

| 6,324,650 | B1 | 11/2001 | Ogilvie |
| 2002/0016910 | A1* | 2/2002 | Wright et al. ................. 713/150 |
| 2003/0014633 | A1* | 1/2003 | Gruber .......................... 713/170 |
| 2003/0147536 | A1 | 8/2003 | Andivahis et al. |
| 2003/0229668 | A1* | 12/2003 | Malik ............................ 709/206 |
| 2005/0071632 | A1* | 3/2005 | Pauker et al. ................. 713/165 |
| 2008/0165972 | A1 | 7/2008 | Worthington |
| 2009/0307762 | A1* | 12/2009 | Cudd, Jr. .......................... 726/5 |
| 2010/0100950 | A1* | 4/2010 | Roberts ............................ 726/7 |
| 2010/0313252 | A1 | 12/2010 | Trouw |
| 2011/0112901 | A1 | 5/2011 | Fried et al. |
| 2011/0296179 | A1* | 12/2011 | Templin et al. ............... 713/168 |
| 2012/0023332 | A1* | 1/2012 | Gorodyansky ............... 713/168 |

* cited by examiner

*Primary Examiner* — Michael S McNally
(74) *Attorney, Agent, or Firm* — Finnegan, Henderson, Farabow, Garrett & Dunner LLP

(57) ABSTRACT

A system and methods for facilitating secure communications on a website are presented. The system comprising a security server configured to receive a secure message from a creator device is disclosed. The security server encodes the received message and sends the encoded message or a representation of the encoded message for posting on the website so that one or more users of the website have the ability to request that the security server make the message available after the encoded message has been decoded.

8 Claims, 4 Drawing Sheets

SYSTEM AND METHODS FOR FACILITATING SECURE COMMUNICATIONS ON A WEBSITE

RELATED APPLICATION

This application is a continuation of U.S. application Ser. No. 13/300,457, filed Nov. 18, 2011, which claims priority from U.S. Provisional Patent Application 61/415,756 titled "Systems and Methods for Facilitating Secure Communications on a Social Website," filed Nov. 19, 2010, and all of which are hereby incorporated by reference in their entirety.

BACKGROUND

In today's world, communication is frequently being performed online via publicly available websites. People post information about themselves and communicate with others via social networking websites, such as Facebook™, GooglePlus™, Myspace™, and LinkedIn™, and blogs. While using online websites, users often knowingly or unwittingly disclose personal information about themselves, or disclose information intended only for a certain audience. Unfortunately, all posted information, including unintentionally disclosed personal information, becomes stored and can be indexed by search engines, archived by robots, or used by advertisers and others. The digital memory of the Internet can cause harm when data is stored and used in ways not anticipated by people who post it.

BRIEF DESCRIPTION OF THE DRAWINGS

The accompanying drawings, which are incorporated in and constitute a part of this specification, illustrate exemplary embodiments and together with the description, serve to explain the principles of these embodiments.

DESCRIPTION OF EXEMPLARY EMBODIMENTS

Systems and methods described herein allow users to post any kind of content anywhere on the Internet in a secure manner, such that only their friends (or other designated people) may view it (and with other limitations) and such that it cannot be indexed by search engines, archived by robots, or used by third-party advertisers and others. The systems and methods described herein give control back to users by restricting the ways that content can be used, while still permitting a free flow of discussion among people authorized to view the communications. Moreover, the systems and methods shield communications from the owners of the social networking websites or other websites, so that users do not have to rely on ever-changing privacy policies.

Reference is now made in detail to the present exemplary embodiments of the disclosure, examples of which are illustrated in the accompanying drawings. Wherever possible, the same reference numbers are used throughout the drawings to refer to the same or like parts.

Figure 1:
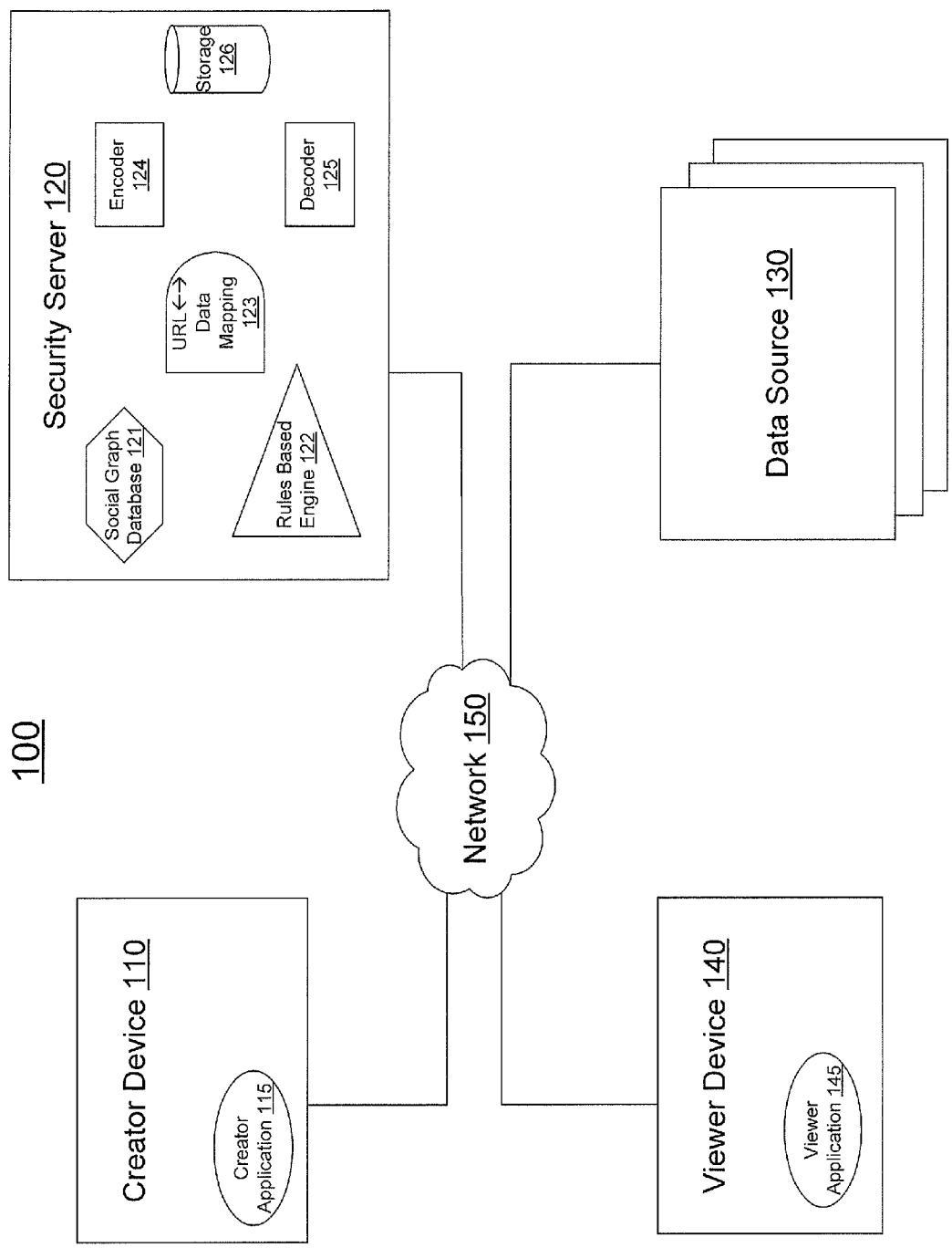
FIG. 1 is a block diagram depicting an exemplary system for providing secure communication amongst website users.

FIG. 1 is a block diagram depicting an exemplary system 100 for facilitating secure communications on a website. System 100 can include a creator device 110, a security server 120, a data source 130, a viewer device 140, and a network 150 that is used for communicating between various components.

Creator device 110 is an electronic device that has the ability to communicate with data source 130 (e.g., website) or an application associated with data source 130. For example, creator device 110 can be a computer, a wireless phone, or any other web-enabled computing device with a processor and a memory. Creator device 110 is operated by a user ("creator") that intends to communicate securely.

Creator device 110 can provide a creator application 115, which can be, for example, a web browser (or other network communication software) with a special add-on, plug-in or bookmarklet, a customized browser, or a mobile application (e.g., iPhone™ or Android™ application). Creator application 115 does not have to be installed software. Creator application 115 can be software running on a device (e.g., creator device 110) and can be used to communicate secure messages (which can include secure publications) on a website (e.g., data source 130). In some embodiments, creator application 115 can encode a message before sending it to security server 120. In other embodiments, creator application 115 might not encode the message before sending it to security server 120, which can then encode the message.

Creator application 115 can be installed on a creator device by, for example, downloading it from a website. For example, a creator could visit a website (such as Reputation.com™'s webpage uProtect.it), signup through Facebook™ Connect, and then install a creator application (e.g., bookmarklet/plug-in) to the browser.

Moreover, creator application 115 can communicate with security server 120 for receiving enhancements to the webpage to indicate that secure messages can be sent. Enhancing the webpage can involve rewriting the underlying code, overlaying a new display, or any other method that allows sending secure messages over an unsecure webpage. On receipt of the appropriate information, creator application 115 can enhance the webpage for indicating that a secure message can be sent. For example, on Facebook™, the indicator could be a yellow/secure button that replaces the normal blue button. The same can be applied for commenting on other websites, including, social networks, blogs, personal webpages, etc. The creator could then compose a message (which includes text, image files, audio/visual files, link, etc.) into a field and send the message by, e.g., clicking the yellow/secure button. Creator application 115 can utilize composition tools provided by a data source (like Facebook™'s "compose a message" screen and editing tools). The exact nature of the composition tool depends on the code used by the website, but may simply intercept the output created by the website's own editing tool (by redirecting it) or can provide a more complex editing system by overlaying new code containing an editing system.

In some embodiments, the message includes the intended recipients of the message. In other embodiments, the intended recipients is information that it not located in the message.

Moreover, creator application 115 redirects the message entered by the creator to security server 120, instead of to data source 130. In some embodiments, "redirecting" can be as simple as creator application 115 editing the source of an HTML form and causing the form's output to be sent to security server 120 rather than to a data source (e.g., a social-networking-website provider). In some embodiments, the redirect may be more complex: for example, the content can be encrypted before sending to the security server, or otherwise pre-processed. Security server 120 is then able to provide a response to the content creator, which can be posted in lieu of the actual content.

This "source-redirect" method allows security server 120 to work even on new pages or pages for which specific security code has not been written. For these types of pages, creator application 115 can recognize that users can publish personal information about themselves and/or communicate with others by comparing certain terms on the website or coded into the website with designated words stored at security server 120 or included in creator application 115. These designated words can indicate that information can be published or communications can take place, such as "Post," "Send," or "Reply." On recognizing the words on the website or coded in the website, creator application 115 can enhance the website's code associated with that term so that a secure publication or a secure message can take place.

Creator device 110 may also include, for example, one or more processors (not shown), a memory (not shown), and a data interface (not shown). The processor(s) may be a single or multiple microprocessors, field programmable gate arrays (FPGAs), or digital signal processors (DSPs) capable of executing particular sets of instructions. Computer-readable instructions may be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the instructions may be implemented in hardware components or combinations of hardware and software such as, for example, Application Specific Integrated Circuits (ASICs), special purpose computers, or general purpose computers.

Security server 120 is hardware, software, or a combination of both that provides the capability for providing secure communications from creator device 110 through data source 130. To provide these secure communications, security server 120 can use one or more of a social graph database 121, a rules based engine 122, a URL-Data mapping 123, an encoder 124, a decoder 125, and a storage 126.

Social graph database 121 is a data storage component that stores information about one or more users (such as the creator of creator device 110). This information can include the creator's contacts according to one or more data sources (such as Facebook™, Myspace™, etc.), entities associated with the creator, or one or more particular recipients of the message. Social graph database 121 can receive this information from data sources (e.g., data source 130) associated with the creator. Social graph database 121, besides storing information received from data sources, can also be configured by the creator to identify other individuals or entities separate from those provided by the data sources. For example, the creator can configure social graph database 121 to classify groupings of people, to include individuals and entities from other social websites, etc. As this social graph information is updated, it can then be stored in social graph database 121. In some embodiments, social graph information can be based on communications from the creator. For example, a message may identify a person or entity not already listed in social graph database 121. Security server 120 can automatically add that person or entity to social graph database 121.

Of note, it is possible to use a grouping specified in one data source as a means for determining permissions in a different data source—for example, a user could post a message on Facebook™ that is only visible to the user's MySpace™ friends. Social graph database 121 can also include a unified social graph of a user (either a creator or a viewer). In some embodiments, a unified social graph can include a user's (either a creator or a viewer) aggregated identities across a plurality (at least two or more) of data sources. In some embodiments, a unified social graph can be an association of some or all of a user's (a creator or a viewer) identities across websites such as Facebook™, LinkedIn™, GooglePlus™ etc, thereby, when a creator sends a secure message to a viewer on a data source (e.g., data source 130), a single message notification to a viewer can be sufficient to enable the viewer to access the message at each of a plurality (two or more) of data sources that is associated with the viewer's unified social graph. For example, if a user has accounts across multiple social networks, a message directed to the user through one social network can be accessed at the other social-network accounts. In one embodiment, let us assume a viewer has at least three identities, an email address (e.g., info@example.com), a Facebook™ userid (e.g., creator123fb), and a LinkedIn™ userid (e.g., creator456ln). After these identities of the viewer are authorized by security server 120 (for example, email verification for the email address identity, Facebook™ connect to authenticate Facebook™ identity, and LinkedIn™ authentication to verify LinkedIn™ identity), even though the viewer might only receive a notification that an encoded message is available for access at say, Facebook™, besides Facebook™, the viewer can also access the encoded message at LinkedIn™ (the encoded message can be populated at LinkedIn™ through an application) or at the info@example.com email account because of the aggregated identities in the viewer's unified social graph. In other embodiments, a viewer can receive multiple message notifications. In some embodiments, the user interface is simplified such that anyone who is a "friend" (social network contact) of the creator may view the protected content, or other default groupings.

Rules based engine 122 is an engine that stores one or more set of rules regarding the message. These rules, for example, can limit the time of day that the message can be viewed, set an expiration date for the message, and set two different expiration dates for the same message sent to different contacts or groups of contacts. In some embodiments, rules can be established that allow the creator to set temporal limits—that is, the ability to view certain content of the message may expire after a certain amount of time, or the content may not be visible until a specific time, or the content may be visible only within certain hours (e.g., weekdays between 9 am and 5 pm) or set times (e.g., only this Monday noon-midnight). These rules may be applied in combination with the setting for who may view content (for example, only friends within certain time periods, or friends always but strangers only during certain hours).

URL-Data mapping 123 is a component that stores the mapping information between the original data of the secure message and the URL link (of data source 130 over which a secure message is being sent) in the encoded secure message.

Encoder 124 is used by security server 120 to encode messages that are received from creator device 110 before they are provided to data source 130. For purposes of this disclosure, encoding includes encryption as well. Encoder 124 can be an encoding application, algorithm, or firmware that encodes the message, which, for example, can be displayed on data source 130. Encoder 124 can use any encoding means (e.g., a hashing algorithm) for encoding the message. In some embodiments, encoder 124 can replace the original message with a link that allows an intended recipient to click, in order to view the original message from creator device 110. In some embodiments, encoder 124 is located at creator device 110 where creator device 110 encodes the message before sending to security server 120.

Decoder 125 is used by security server 120 to decode an encoded message before providing the message to the intended recipient (e.g., viewer of viewer device 140). Decoder 125 can be a decoding application, algorithm, or firmware that decodes the encoded message. Decoder 125 can use any decoding means (e.g., a hashing algorithm) for decoding the message. For example, decoder 125 can use a decryption key for decoding the encoded message. In some embodiments, decoder 125 is located at viewer device 140 where viewer device 140 decodes the encoded message.

In some embodiments, security server 120 may not utilize encoder 124 and decoder 125. In this scenario, security server 120 can receive the original message from creator device 110, store the original message, and notify the recipient of the message that there is message waiting for the recipient. To see this message, the recipient may have to register with security server 120 to see the message. In some embodiments, the recipient may need to enter a password to see the message.

Storage 126 is a data storage component that stores information about the message received from creator device 110. In some embodiments, storage 126 stores the original message and all of the particulars thereof (e.g., intended recipients). In other embodiments, storage 126 stores an encoded message that was encoded by either encoder 124 or creator application 115. In some other embodiments, storage 126 can also store encoding information and/or a security key (e.g., encryption and decryption keys). In some embodiments, storage 126 can be part of a network cloud, which can include, for example, one or more networked-security servers. Storage 126 can be, for example, a random access memory (RAM), a read only memory (ROM), a programmable read-only memory (PROM), a field programmable read-only memory (FPROM), or other dynamic storage device for storing information and instructions to be used by any component of security server 120. Storage 126 can also include a database, one or more computer files in a directory structure, or any other appropriate tangible data storage mechanism such as a memory. In some embodiments, storage 126 can be distributed across a plurality of different storage mechanisms.

Security server 120 may also include, for example, one or more processors (not shown), a memory (not shown), and a data interface (not shown). The processor(s) may be a single or multiple microprocessors, field programmable gate arrays (FPGAs), or digital signal processors (DSPs) capable of executing particular sets of instructions. Computer-readable instructions may be stored on a tangible non-transitory computer-readable medium, such as a flexible disk, a hard disk, a CD-ROM (compact disk-read only memory), a MO (magneto-optical), a DVD-ROM (digital versatile disk-read only memory), a DVD-RAM (digital versatile disk-random access memory), or a semiconductor memory. Alternatively, the instructions may be implemented in hardware components or combinations of hardware and software such as, for example, Application Specific Integrated Circuits (ASICs), special purpose computers, or general purpose computers. Security server 120 may be implemented on a single computer, or may be distributed across a plurality of computers. Security server 120 may be coupled to multiple data sources similar to data source 130 either via network 150 or via other coupling means. For security purposes, while it is advantageous for security server 120 to be managed by a party that is not associated with a data source that publishes its user's personal information, it can also be an option implemented by a data source (e.g., data source 130). In some embodiments, security server 120 can be a part of a network cloud, which can include, for example, one or more networked-security servers.

Data source 130 is a website, which can include social networking websites (e.g., Facebook™, GooglePlus™, Myspace™, and LinkedIn™, or blogs, etc.) or any other website that allows its users (people or entities) to publish personal information about themselves and/or to communicate with others. Data source 130 can include a database, including a proprietary database containing information about one or more users. Data source 130 may, for example, be private party websites, company websites, or cached information stored in a search database, such as those maintained at Google™ or Yahoo™. Data source 130 may, in alternative examples, be a criminal database or listing, a credit agency data source, an insurance database, facial recognition database, a fingerprint database, a DNA database, a retinal database, or any electronic or other source of information about any user. There may be any number of data sources 130. While portions of the specification may refer to only one data source 130, this has been done for simplification purposes only and, unless noted otherwise, is not meant to limit the described embodiments in any way. In some embodiments, data source 130 may also have a security server (such as security server 120).

In some embodiments, the system includes a viewer device 140, which can provide the secure message for viewing. Viewer device 140 is an electronic device that has the ability to communicate with security server 120 and with data source 130 or an application associated with data source 130. For example, viewer device 140 can be a computer, a wireless phone, or any other web-enabled computing device with a processor and a memory.

Viewer device 140 can include a viewer application 145, which may be, for example, a browser (or network communication software) that may or may not have a special add-on bookmarklet. Viewer application 145 can be software running on a device like viewer device 140, that a viewer can use to access secure messages on a website. In some embodiments, where security server 120 has an encoded message, viewer application 145 can include an algorithm for decoding the encoded message.

In other embodiments, viewer application 145 can be optional. In embodiments, where viewer application 145 is not used, viewer device 140 can provide a link. The link (which can be encoded) can provide a popup window, an overlay, or any other means for displaying the decoded message. The popup window can also provide a form that allows a viewer to post an encoded message as a response. In some embodiments, the popup window can request registration information from the viewer before providing the message for display.

Viewer device 140 may also include, for example, one or more processors (not shown), a memory (not shown), and a data interface (not shown). The processor(s) may be a single or multiple microprocessors, field programmable gate arrays (FPGAs), or digital signal processors (DSPs) capable of executing particular sets of instructions. Computer-readable instructions may be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the instructions may be implemented in hardware components or combinations of hardware and software such as, for example, ASICs, special purpose computers, or general purpose computers.

Network 150 may be, for example, the Internet, an intranet, a local area network, a wide area network, a campus area network, a metropolitan area network, an extranet, a private extranet, any set of two or more coupled electronic devices, or a combination of any of these or other appropriate networks.

In some embodiments, the systems and methods described herein can also be implemented in mobile devices providing web content. For example, using a website application on a mobile device, a viewer can click on an encoded message or link. Clicking the encoded message or link can then cause an embedded browser to direct the viewer to an application or page associated with the third-party cloud. The application or page can then provide the decoded secure message. The application or page can also allow the viewer the ability to securely reply to the decoded message.

Figure 2:
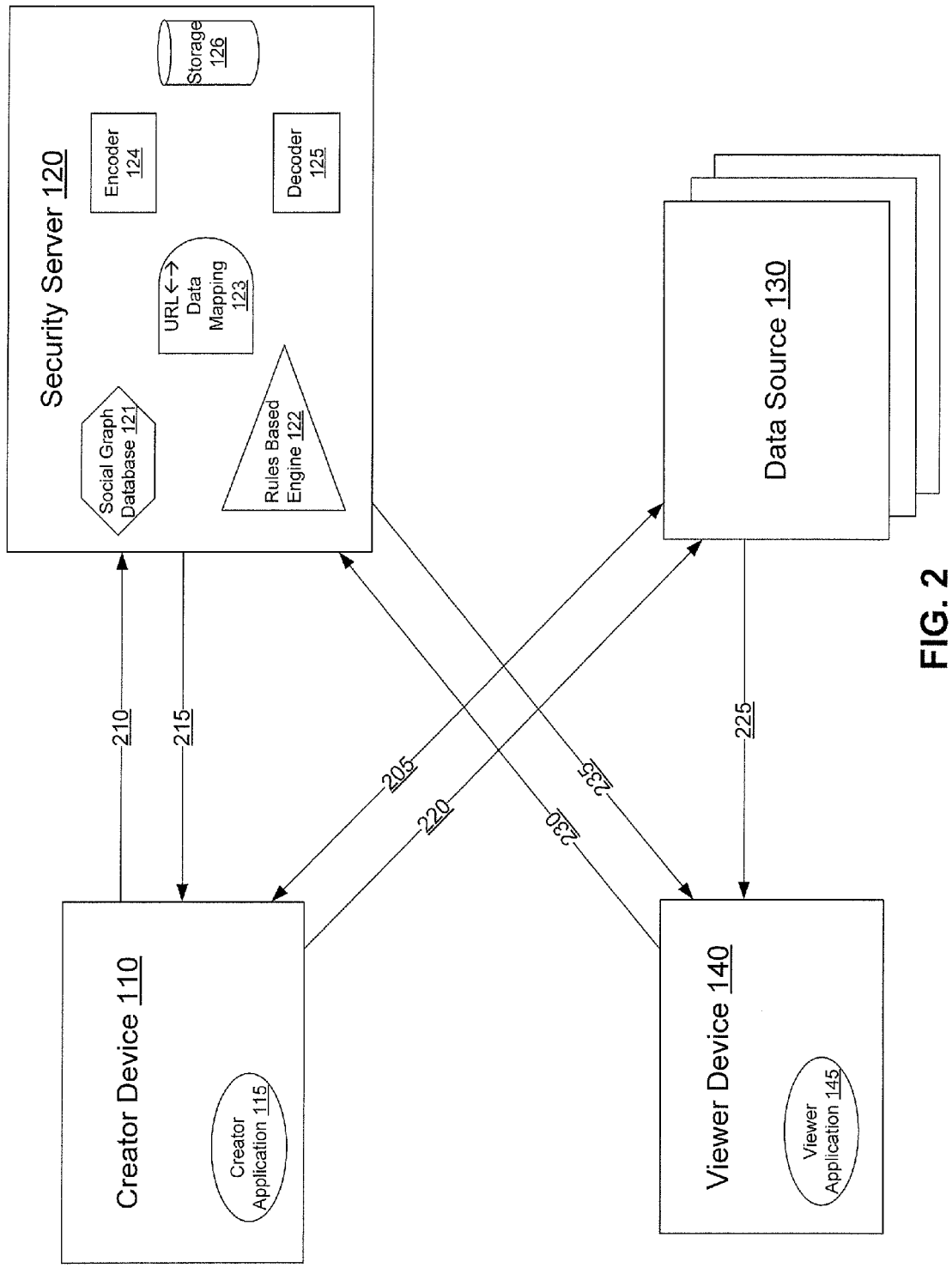
FIG. 2 is a functional diagram depicting exemplary steps performed by the exemplary system of FIG. 1 in facilitating secure communications on a website.

FIG. 2 is a functional diagram depicting exemplary steps performed by exemplary system 100 of FIG. 1 in facilitating a secure message through data source 130.

In step 205, creator device 110 communicates with data source 130 for downloading the webpage associated with data source 130 (e.g., website like Facebook™). After creator device 110 receives the webpage, creator composes a message using creator application 115, which allows creator device 110 to provide the option of sending a secure message. In this embodiment, creator intends to send a secure message to a recipient or a group of recipients. Creator application 115 can enhance the webpage for indicating that a secure message can now be sent. For example, on Facebook™, the indicator could be a yellow/secure button that replaces the normal blue button. Creator device 110 could receive, from creator, a message (which includes text, image files, audio/visual files, link, etc.) that was inserted into a field, and a notification to send the message (e.g., clicking the yellow/secure button).

In step 210, creator device 110 sends the message, which can include the content to be displayed (or a link or reference to it) as well as information about the recipient or group of recipients, to security server 120. This message can also contain one or more creator-established rules. On receipt of the message, security server 120 can store the recipient information and rules from the message into social graph database 121 and rules based engine 122, respectively.

In some embodiments, security server 120 stores the original message into storage 126. In some other embodiments, security server 120 encodes the message using encoder 124. Alternatively, the message received from creator device 110 has already been encoded (or encrypted) by an encoder at creator device 110. In either scenario, irrespective of where the message is encoded, the encoded message can then be stored in storage 126.

In some embodiments where security server 120 is a part of a network cloud, the message (whether it is encoded or not) can be stored in the network cloud storage. In some embodiments, security server 120 can pass a reference indicating where the message (whether it is encoded or not) is stored to creator application 115.

In step 215, security server 120 can send the encoded message or a link associated with the original message to creator application 115. In step 220, creator device 110, using creator application 115, can send the encoded message or a link associated with the original message to data source 130 for posting. This encoded message or link can replace the original message entered by the creator. In step 225, the encoded message is posted on data source 130 and the relevant viewers (intended recipient or group of recipients), according to the original message, rules based engine 122, and social graph database 121, are notified of this message. So viewers (or viewers designated to see the encoded secure message) reviewing data source 130 can access the encoded message or a link associated with the original message.

A viewer using viewer device 140, upon finding a notification that an encoded message is accessible, can visit the webpage provided by data source 130 (e.g., Facebook™) and can click the notification. Clicking the notification causes viewer device 140 to send an access request (step 230) for the encoded message to security server 120. In some embodiments, the access request includes the viewer's credentials.

On receiving the request, security server 120 can decode the encoded message based on the viewer's credentials, the social graphs, and/or rules. In some embodiments, security server 120 can then check the viewer's credentials against the restrictions on the content stored in social graph database 121 or set in rules based engine 122. If the credentials are authorized, then the viewer is authorized. In some embodiments, social graph database 121 can include unified social graph of the creator which can allow an authorized user to access the secure message across multiple websites, according to the creator's unified social graph information. For example, if the creator posts a secure message on Facebook™, and if a viewer is part of the creator's unified social graph comprising, say, Facebook™, and LinkedIn™, an authorized viewer can access the secure message on LinkedIn™, in addition to Facebook™. In some embodiments, a viewer can also have a unified social graph at the security server. In some embodiments, before sending the decoded message or content, security server 120 can verify (before sending the decoded message to viewer device 140) with data source 130 that the viewer is still a contact of the creator. After the message has been decoded and any authorization procedures have been completed, at step 235, security server 120 sends the decoded message to viewer device 140 for viewing.

In some other embodiments, security server 120 can send an encoded message to viewer device 140. Viewer device 140, using viewer application 145, can then decode the message in order to view the original message prepared at creator device 110. In some embodiments, viewer application 145 can make the display of the decoded content appear seamless by displaying it in the flow of the website, as if it were always there. In other embodiments, viewer application 145 can highlight the protected content of the message (through use of a different background color or with a text message about it), or can place it in a "click to expand protected content" box. The process of editing an existing website is known in the art using technologies such as JavaScript, browser plug-ins, etc.

In some other embodiments, instead of viewer device 140 communicating directly with security server 120, the communications between viewer device 140 and security server 120 can pass through data source 130. To maintain the security of the message, security server 120 sends the encoded message (or a reference to it) to data source 130. Data source 130 updates its webpage accordingly, thereby providing a notification to viewer device 140 that the viewer has received a message. On receiving the encoded message, viewer device 140 (using viewer application 145) decodes the encoded message so that viewer can view the original message.

In some embodiments, nonpublicly displayed messages (e.g., friend requests) directed to users can be encoded. To review the nonpublic displayed messages, a viewer can select the encoded link. The selected link can allow security server 120 to provide the viewer with the nonpublicly displayed message so long as the viewer has permission/authorization (according to social graph database 121) or is registered to see the message. These permissions can be distinguished amongst the creator's contacts. Moreover, the creator can also have rules for the messages, e.g., time window to review the encoded message, location limit, etc.

In some embodiments, the creator can, from a website of data source 130, upload an image to security server 120. Security server 120 can provide a fake image notification the website. This fake image can be a random image or an image notifying friends or other individuals viewing the website that the real image can be viewed based on any of the exemplary methods described herein.

Figure 3:
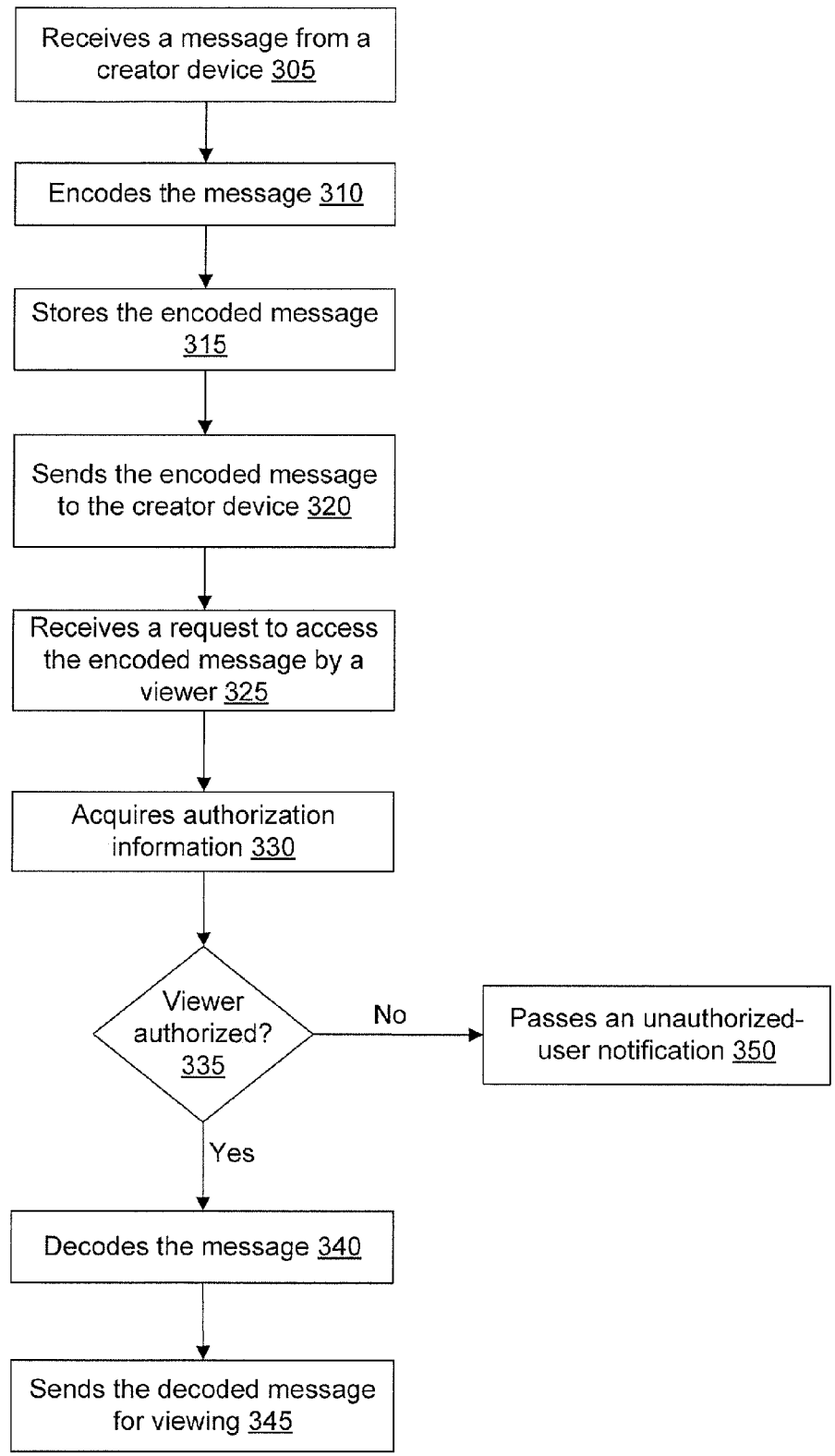
FIG. 3 is a flowchart representing an exemplary method to facilitate secure communications on a website.

FIG. 3 depicts a flowchart representing an exemplary method performed by a security server to facilitate secure communications through a public website. While the flowchart discloses the following steps in a particular order, it is appreciated that at least some of the steps can be moved, modified, or deleted where appropriate.

In this exemplary embodiment, a creator application has been installed on a creator device. The creator device can communicate with the security server for obtaining the creator application. On receiving the creator application, the creator device (using the creator application) can enhance a website. Enhancing the website can involve rewriting the underlying code, overlaying a new display, or any other method that allows sending secure messages over an unsecure website. The enhancements can also include redirecting a message intended to be secure to go to the security server, instead of the website associated with a data source. In some embodiments, the enhancements depend on which website the creator is or will be visiting. After enhancing the website, the creator (using the creator application on the creator device) composes a message, which allows the creator device to provide the option of sending a secure message.

In step 305, the security server receives the message from the creator device. The received message can include the content of the message, the one or more recipients of the message or one or more groups, and one or more user-established rules. In some embodiments, the message can include information about the creator's social graph. The social graph information can identify, for example, the creator's contacts according to the website, entities associated with the creator, or information about one or more particular recipients of the secure message. In its most simple form, in some embodiments, the information about the creator's social graph could be an authentication token. In other embodiments, the information about the creator's social graph can be more complex, such as a set of website's authentication tokens or a reference to a profile created by the creator on the security server. For example, on Reputation.com™, users can create a profile listing their social network memberships. In some embodiments, this profile could be the information sent to the security server. In some embodiments, rules can be established that allow the creator to set temporal limits—that is, the ability to view certain content can expire after a certain amount of time, or content cannot be visible until a specific time, or content may be visible only within certain hours (e.g., weekdays between 9 am and 5 pm) or set times (e.g., only this Monday noon-midnight). In some embodiments, rules can be established to set an expiration date for the message, or set two different expiration dates for the same message sent to different contacts or groups of contacts. These limits can be applied in combination with the setting for who may view the message (for example, only friends within certain time periods, or friends always but strangers only during certain hours).

In step 310, the security server encodes the message. Messages (text, HTML, images, video, etc.) may be encoded using public-key encryption techniques or other methods known in the art. For example, images may be encoded in binary (thus making the encoded version invalid and not viewable) or the original image may be hidden within a fixed image (such as "please log in to see this image") using steganography techniques known in the art. As stated previously, in some other embodiments, the message is not encoded at a security server.

In step 315, the security server stores the encoded message in a storage or in a network cloud storage. In some other embodiments, the security server can store the original message in the storage or in the network cloud storage.

In step 320, the security server sends the encoded message (or a reference to the encoded message) to the creator device. The creator device (using the creator application) can then post the encoded message (or the reference to the encoded message) on the website of a data source so that one or more users of the data source can view the encoded message. This encoded message can replace the original message entered by the creator. For example, a creator can post the encoded message on a Facebook™ page, allowing some or all of the creator's contacts to see that the creator has posted the encoded message. Whether the creator device posts the encoded message or a reference to the encoded message can be based on preferences set up by creator or be determined by the creator application or by the security server. The reference to the stored version of the encoded message can be a link (e.g., "To see this content, visit uProtect.It/view/125125125") or another means for identifying a location for obtaining the original message.

In some embodiments, the encoded message is posted on the website and the relevant viewers, according to a rules based engine (e.g., rules based engine 122) or a social graph database (e.g., social graph database 121), are notified of this message. So viewers (or viewers designated to see the encoded message) reviewing the data source can access the encoded message or a link associated with the original message.

In some embodiments in which the security server does not encode the content, the creator device can then encode the content before uploading the content to the website of the data source. In some embodiments, the security server can send the encoded content to the data source directly.

After sending the encoded message, at step 325, the security server receives a request to access the encoded message from a viewer device. The request can be triggered by a viewer of viewer device clicking a notification that an encoded message is available for viewing.

On receiving the request, at step 330, the security server can acquire authorization information to perform an authorization process. In some embodiments, the request includes the viewer's credentials. The authorization process can involve determining whether the viewer that sent the request for the original content is authorized or whether there are any rules preventing the release of the original content. The security server can have social graph information indicating whether the viewer is authorized to see the original message based on that viewer's credentials. For example, while a creator can send a message to a particular recipient and that same recipient sends a request to see the original message, the security server can still check the creator's social graph information to determine whether that recipient is still listed as a contact just in case the creator decided (after the message was sent but before the viewer requested the message) that recipient is no longer a contact. In some embodiments, the security server can check with the data source to determine whether the viewer it still a contact before providing the decoded message to the viewer device.

Moreover, the security server can have a rules based engine (e.g., rules based engine 122) that has rules for determining whether there are any limits for displaying the message. For example, as stated previously, these rules can limit the time of day that the secure message can be viewed, set an expiration date for the secure message, and set two different expiration dates for the same message sent to different contacts or groups of contacts. In some embodiments, rules can be established that allow the creator to set temporal limits—that is, the ability to view certain content may expire after a certain amount of time, or content may not be visible until a specific time, or content may be visible only within certain hours (e.g., weekdays between 9 am and 5 pm) or set times (e.g., only this Monday noon-midnight). These rules may be applied in combination with the setting for who may view content (for example, only friends within certain time periods, or friends always but strangers only during certain hours).

After acquiring the necessary information, at step 335, the security server determines whether the viewer is authorized to view the message. If so, the security server decodes the encoded message at step 340 by acquiring the encoded message from the storage and then decoding the encoded message accordingly. Decoding the message can include a decryption key or any other method for decoding the message. After decoding the encoded message, the security server can then send (at step 345) the decoded message to the viewer device of the authorized viewer. In some embodiments, the security server can send the encoded message to the viewer device, which then (using a viewer application) can decode the encoded message before displaying it to the viewer. In some embodiments, the security server sends a reference to the message (whether it is encoded or not) that, for example, provides a link to where the message can be located. In some embodiments, the security server can send an encoded message through the data source to the viewer device, which can then decode the message or a reference to the location of the message.

If the security server determines that viewer is not authorized, at step 350, the security server sends a notification that the viewer is not authorized to see the decoded message. The unauthorized-user notification can be a message stating that the viewer is not authorized or can be an advertisement, or it may simply leave a blank space on the page. In some embodiments, unauthorized viewers can see an explanatory message ("To see this content, visit uProtect.It/view/125125125"), an advertisement, or the encrypted content. If unauthorized viewers click through to the explanatory message, they can see a longer message explaining the system (or an advertisement or other content) rather than the protected content. In some embodiments, when a viewer, who is a nonregistered user of the third-party cloud, clicks on an encoded link, a pop-up window can appear, asking for registration information from the user. In this case, after providing the registration information, the viewer can then see the decoded message. This notification can be sent to the viewer device directly or indirectly via the data source.

Figure 4:
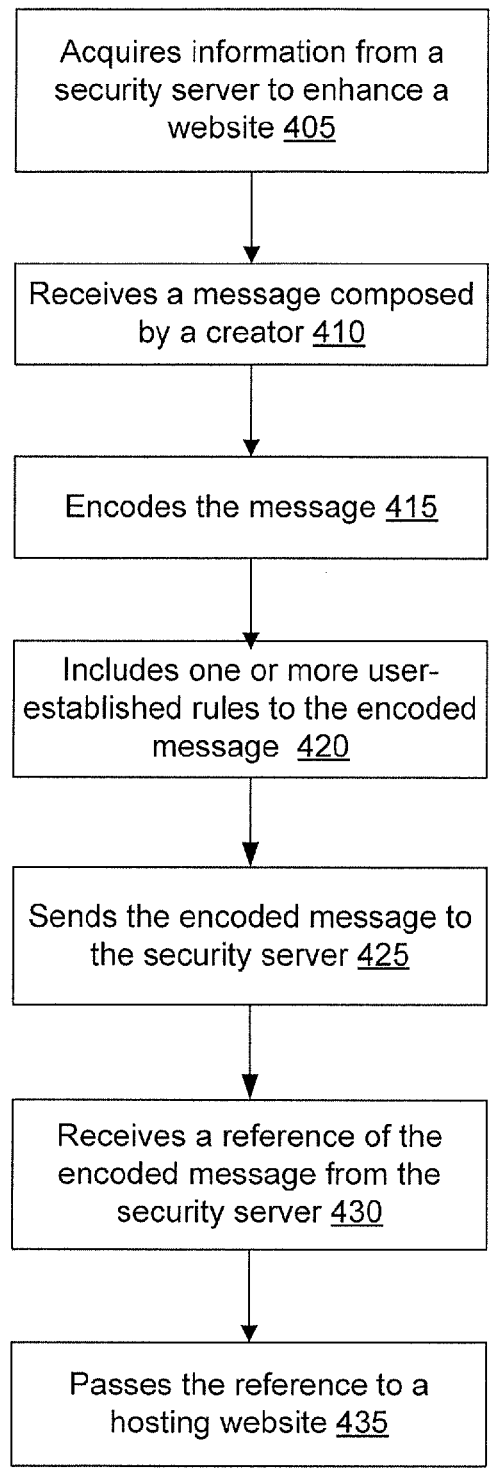
FIG. 4 is a flowchart representing an exemplary method to facilitate secure communications on a website.

FIG. 4 depicts a flowchart representing another exemplary method performed by a creator device to facilitate secure communications on a website. While the flowchart discloses the following steps in a particular order, it is appreciated that at least some of the steps can be moved, modified, or deleted where appropriate.

In this exemplary embodiment, a creator application has been installed on the creator device. The creator device can communicate with a security server for obtaining the creator application. On receiving the creator application, the creator device (using the creator application) can acquire information (for example, according to URL-Data Mapping 123) from the security server to enhance a website as in step 405. Enhancing the website can involve rewriting the underlying code, overlaying a new display, or any other method that allows sending secure messages over an unsecure website. The enhancements can also include redirecting a message intended to be secure to go to the security server, instead of the website associated with a data source. In some embodiments, the enhancements depend on which website a creator is or will be visiting.

In step 410, the creator device receives as input a message composed by the creator. In step 415, the creator device encodes the content of the message. Content (text, HTML, images, video, etc.) may be encoded using public-key encryption techniques or other methods known in the art. For example, images may be encoded in binary (thus making the encoded version invalid and not viewable) or the original image may be hidden within a fixed image (such as "please log in to see this image") using steganography techniques known in the art. As stated previously, in some embodiments, the message is not encoded at the creator device. In some embodiments, encoding the content of the message can be done at the security server.

In step 420, the creator device includes one or more rules to the encoded message. The user-established rules set various conditions on the access of the message. In some embodiments, these rules can allow the creator to set temporal limits—that is, the ability to view certain content can expire after a certain amount of time, or content cannot be visible until a specific time, or content may be visible only within certain hours (e.g., weekdays between 9 am and 5 pm) or set times (e.g., only this Monday noon-midnight). In some embodiments, these rules can set an expiration date for the message, or set two different expiration dates for the same message sent to different contacts or groups of contacts. These limits can be applied in combination with the setting for who may view content (for example, only friends within certain time periods, or friends always but strangers only during certain hours). In some embodiments, the rules have been set at the security server and are not included with the message. In some embodiments, rules simply may not be included with the message.

In step 425, the creator device sends the encoded message to the security server. The sent message can include the content of the message, the one or more recipients of the message or one or more groups, and one or more user-established rules. In some embodiments, the message can include information about the creator's social graph. The social graph information can identify, for example, the creator's contacts according to the website, entities associated with the creator, or information about one or more particular recipients of the secure message. In its most simple form, in some embodiments, the information about the creator's social graph could be an authentication token. In other embodiments, the information about the creator's social graph can be more complex, such as a set of website's authentication tokens or a reference to a profile created by the creator on the security server. For example, on Reputation.com™, users can create a profile listing their social network memberships. In some embodiments, this profile could be the information sent to the security server. In some embodiments, the message sent to the security server is not encoded at the creator device and then the security server can encode the received message or portions of the received message using an encoder (e.g., encoder 124).

After sending the message to security server, which can further process the message, at step 430, the creator device receives a reference of the encoded message from the security server, indicating where the encoded content is present. The creator device (using the creator application) can then pass the reference (step 435) of the encoded message to a hosting website of a data source to post the reference to the encoded content, so that one or more users of the data source can view the reference to the encoded message. The reference to the stored version of the encoded message can be a link (e.g., "To see this content, visit uProtect.It/view/125125125") or another means for identifying a location for obtaining the original content.

In some embodiments, where the security server provided the creator device with an encoded message after the creator device sent the original message to security server, the creator device can pass the encoded message to the hosting website of the data source for posting. This encoded message can replace the original message entered by the creator. For example, a creator can post the encoded content on a Facebook™ page, allowing some or all of the creator's contacts to see that the creator has posted the encoded content. Whether the creator device posts the encoded content or a reference to the encoded content can be based on preferences set up by creator or be determined by the creator application or by the security server.

In some embodiments, the creator, through the creator application on the creator device, could see statistics about how many people (or who) attempted to view the creator's protected content. These statistics are collated at security server 120 as each viewer requests to view the content of the secure message.

Alternate Implementations

Alternate implementations may include:

For blogging platforms like WordPress™, a server-side plug-in is available to provide secure communications. It can be used by the creator of the blog to post securely, or to enable blog readers to comment securely. In such a case, the encrypted communication can take place between the blog server and security server 120.

Because security server 120 sits between users (e.g., creators) and websites, it can enable users to share types of content that would not otherwise be possible. For example, the services provided by security server 120 can be used to share images in Facebook™ comments, which would otherwise not be possible. If the creator is using creator application 115 and the viewer is using viewer application 145, they can communicate more richly than through the website's commenting scheme, because creator application 115 and viewer application 145 can both post and display images and video.

If communications to security server is not possible (or otherwise not desired) at the time that the creator wants to post a message, an alternate mode for operation could include providing the creator with pre-assigned encryption codes. The encryption can occur on the creator side, and then security server 120 can pass the pre-set decryption codes to viewer application 115 if the viewer has permission to see the content.

In some embodiments, creators can designate parts of messages to be displayed to all and parts to be kept secret. For example, a creator could post a message with the first sentence visible to the world and the second sentence visible only to friends. Creators can similarly select to use a low-resolution image for non-contacts and a full-resolution version for contacts (for example, if a user wanted to share a photo but didn't want others to download the full version). Creators (such as photographers, etc.) can apply a watermark to images as well. Similar techniques can be applied to video.

Rules based engine 122 for decrypting content can also be based on other methods, such as an employee directory or similar. Certain roles in the employee directory may be authorized to view content, while others may not.

Security server 120 can be implemented by a field-programmable gate array (FPGA), an application-specific integrated circuit (ASIC), a complex programmable logic device (CPLD), a printed circuit board (PCB), a combination of programmable logic components and programmable interconnects, single central processing unit (CPU) chip, a CPU chip combined on a motherboard, a general purpose computer, or any other combination of devices or modules capable of performing the tasks described above. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A method for providing secure communications through a social networking website, the method comprising:
   acquiring information for enhancing a local version of a social networking website that is or can be displayed at an electronic device, wherein the enhancement is a creator application that allows the sending of a secure message through the social networking website;
   receiving, at the electronic device, a message as input from a creator, wherein one or more creator-established rules limit the publication of the message through the social networking website;
   sending, by the creator application, the message to a security server, wherein the sent message is or will be encoded;
   receiving the encoded message or a reference to the encoded message; and
   passing the encoded message or a reference to the encoded message through the social networking website, wherein the passed encoded message is posted so that one or more users of the social networking website have the ability to request that the message be made available after the encoded message has been decoded.

2. The method of claim 1, further comprising encoding the message before sending the message to the security server.

3. The method of claim 1, further comprising including the one or more creator-established rules with the message.

4. The method of claim 1, wherein the message can be text, one or more image files, one or more audio/visual files, or a link.

5. A non-transitory computer-readable medium that stores a set of instructions that are executable by an electronic device to cause the electronic device to perform a method for providing secure communications through a social networking website, the method comprising:
   acquiring information for enhancing a local version of a social networking website that is or can be displayed at the electronic device, wherein the enhancement is a creator application that allows the sending of a secure message through the social networking website;

receiving, at the electronic device, a message as input from a creator, wherein one or more creator-established rules limit the publication of the message through the social networking website;

sending, by the creator application, the message to a security server, wherein the sent message is or will be encoded;

receiving the encoded message or a reference to the encoded message; and passing the encoded message or a reference to the encoded message through the social networking website, wherein the passed encoded message is posted so that one or more users of the social networking website have the ability to request that the message be made available after the encoded message has been decoded.

6. The computer-readable medium of claim 5, further comprising instructions executable by the electronic device to cause the electronic device to perform:

encoding the message before sending the message to the security server.

7. The computer-readable medium of claim 5, further comprising instructions executable by the electronic device to cause the electronic device to perform:

including the one or more creator-established rules with the message.

8. The computer-readable medium of claim 5, wherein the message can be text, one or more image files, one or more audio/visual files, or a link.

* * * * *